Sept. 11, 1951 R. P. REASON 2,567,349
HEATED TRACTOR SEAT
Filed Nov. 17, 1947 2 Sheets-Sheet 1
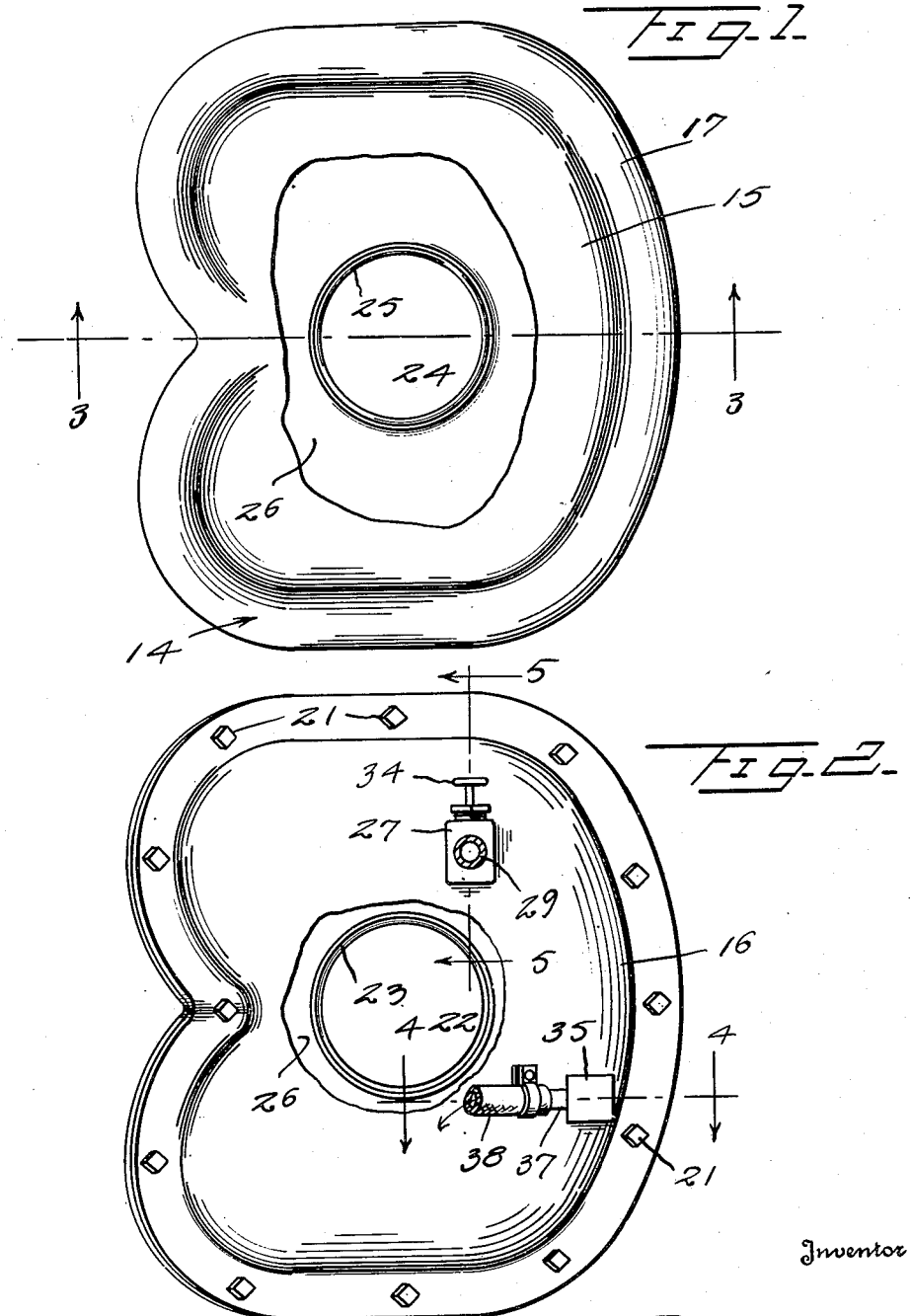

Sept. 11, 1951 R. P. REASON 2,567,349
HEATED TRACTOR SEAT
Filed Nov. 17, 1947 2 Sheets-Sheet 2
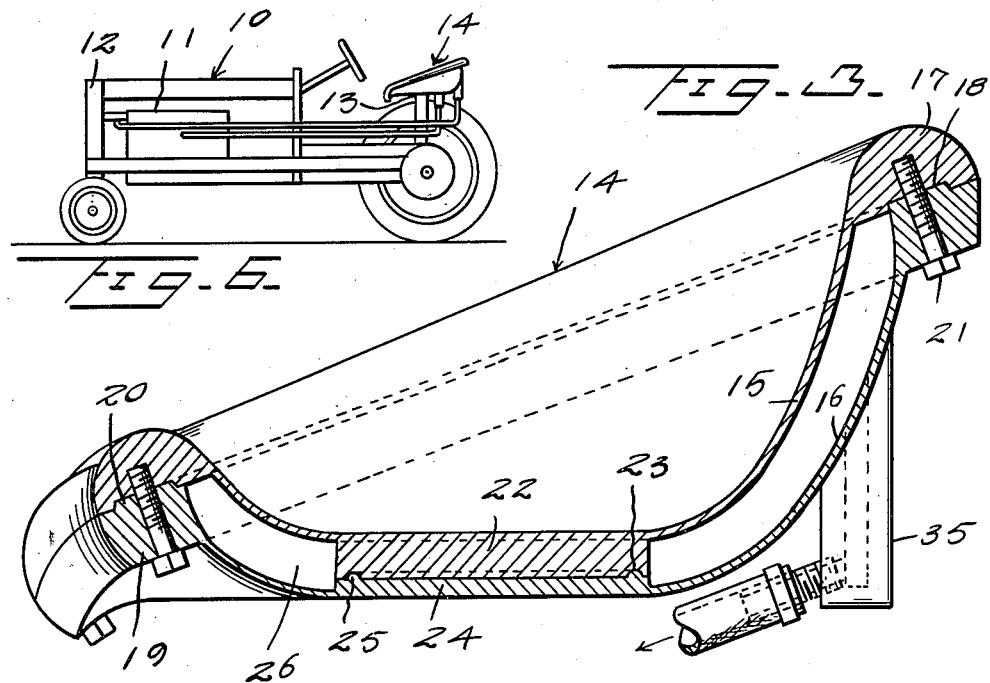
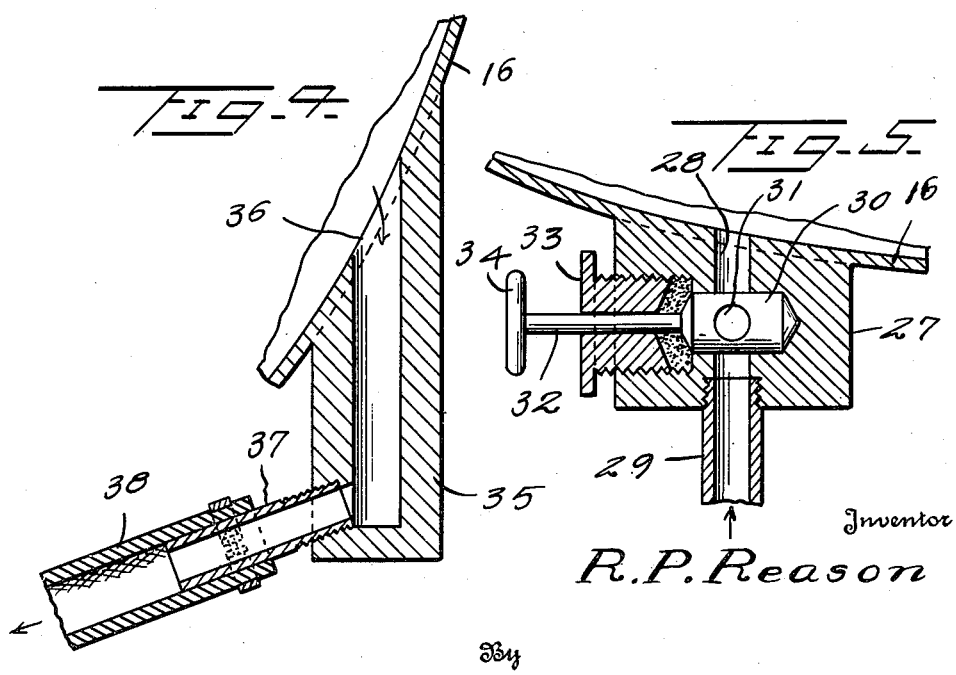
Inventor
R. P. Reason
By
Kimmel & Crowell Attys.

Patented Sept. 11, 1951

2,567,349

UNITED STATES PATENT OFFICE 2,567,349

HEATED TRACTOR SEAT

Ronald P. Reason, Keithsburg, Ill., assignor, by direct and mesne assignments, to D. M. Smalley, Cedar Rapids, Iowa Application November 17, 1947, Serial No. 786,359

2 Claims. (Cl. 155—1)

This invention relates to heated seats for vehicles.

An object of this invention is to provide a hollow seat for mounting on a vehicle, such as a tractor or the like, and for connection to the cooling system of the engine, so that the seat will be heated.

Another object of this invention is to provide in combination, a tractor including a seat, and means for heating the seat from the engine with a regulating valve for regulating the flow of water or other liquid through the seat so that during the summer months the circulation of the liquid may be cut off from the seat, whereas during the cooler months the circulation through the seat may be turned on.

A further object of this invention is to provide a seat of this kind which is of simple construction and can be mounted on any conventional tractor or other vehicle.

A further object of this invention is to provide a seat of this kind which can be made by casting, stamping or the like.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a plan view, partly broken away, of a heated seat constructed according to an embodiment of this invention.

Figure 2 is a bottom plan view, partly broken away, of the device.

Figure 3 is a sectional view taken on the line 3—3 of Figure 1.

Figure 4 is a fragmentary sectional view taken on the line 4—4 of Figure 2.

Figure 5 is a fragmentary sectional view taken on the line 5—5 of Figure 2.

Figure 6 is a diagrammatic view showing the combination of this seat with a tractor.

Referring to the drawings, the numeral 10 designates generally a conventional tractor having an engine 11 and a radiator 12 which is interposed in the cooling system for the engine 11. A seat, generally designated as 14, is supported from a support 13 at the rear of the tractor 10 and the seat 14 comprises upper and lower spaced concave walls 15 and 16. The upper wall 15 is formed with a relatively thick marginal edge 17 having a channel 18 therein. The lower wall 16 is formed with a relatively thick marginal edge 19 having a key 20 which is adapted to engage in the channel 18. The two marginal edges 17 and 19 are adapted to be secured together by means of fastening members 21 which extend through the lower marginal edge portion 19 and are threaded into the upper marginal edge portion 17.

The upper wall 15 is formed in substantially the center thereof with an annular block or positioning member 22 having an annular groove 23 and the lower wall 16 in substantially the center thereof is formed with a complementary block 24 having an annular rib 25 engaging in the groove 23. The two blocks 22 and 24 form a solid central portion for the seat so that the central portion of the seat may receive securing means (not shown) for securing the seat to the supporting post 13.

The space 26 between the two walls 15 and 16 forms a heating chamber and the lower wall 16 has extending downwardly therefrom a lug 27 which provides a valve housing. The lug or integral valve housing member 27 is formed with a passage 28 therethrough communicating with the chamber 16 and a nipple 29 is threaded in the lug or housing 27 and is adapted to have a connecting hose secured thereto for connecting the lug or valve housing 27 with the engine block 11. The lug or valve housing 27 has disposed therein a rotatable valve plug 30 formed with an opening 31 and a stem 32 extends from the plug 30 and rotatably engages through a packing gland 33 which is threaded into the lug or housing 27. The stem 32 has secured to the outer end thereof a wheel or operator 34 so that the plug 30 may be rotated either to open or cut-off position. The lower wall 16 also has extending downwardly therefrom a lug 35 formed with a passage 36 communicating with the chamber 26. An outlet nipple 37 is threaded into the lower portion of the lug 35 and is adapted to have a hose 38 secured thereto and connected to the radiator 12.

In the use of this seat, the seat member 14 is adapted to be secured to the supporting member 13 of the tractor 10. The intake pipe or nipple 29 is connected to the engine block 11 and the outlet nipple 37 is connected to the radiator 12. When it is desired to heat the seat 14 valve plug 30 is turned to open position so that the heating medium in the cooling system of the vehicle may circulate through the chamber 26.

This device may be formed of either cast or stamped material and can be produced at relatively small cost and mounted on any conventional tractor or other vehicle. During the summer months the valve 30 may be turned to cut-off position so as to cut off circulation of the cooling medium from the engine 11.

I claim:

1. A tractor seat comprising upwardly dished spaced apart upper and lower walls, thickened marginal portions formed on each of said walls, means engaging said marginal portions for securing said upper and lower walls together, said upper and lower walls being formed with centrally disposed inwardly extending blocks having engageable grooves and ribs for positioning said upper wall relative to said lower wall, valved inlet means carried by said lower wall, and outlet means carried by said lower wall whereby the space between said upper and lower walls is adapted to contain a heating fluid.

2. A tractor seat comprising lower and upper walls having mid-section areas spaced apart and peripheral edges thereof formed as engaging marginal portions, said upper wall being dish-shaped, said upper and lower walls having centrally disposed inwardly extending abutments as positioning means disposed therebetween for positioning said upper wall relative to said lower wall, valved inlet means carried by said lower wall, and outlet means carried by said lower wall whereby the space between said upper and lower walls is adapted to contain a heating fluid.

RONALD P. REASON.

REFERENCES CITED

The following references are of record in the file of this patent:

UNITED STATES PATENTS

| Number | Name | Date |
|---|---|---|
| 198,351 | Chase | Dec. 18, 1877 |
| 1,091,816 | Duderer | Mar. 31, 1914 |
| 1,156,637 | Shultz | Oct. 12, 1915 |
| 1,452,313 | Roos | Apr. 17, 1923 |
| 2,050,381 | Rogers | Aug. 11, 1936 |
| 2,410,727 | Furbish | Nov. 5, 1946 |

FOREIGN PATENTS

| Number | Country | Date |
|---|---|---|
| 58,162 | Switzerland | May 18, 1911 |
| 178,999 | Switzerland | Nov. 1, 1935 |
| 614,003 | Germany | May 31, 1935 |